United States Patent
Mraz et al.

(10) Patent No.: US 9,575,987 B2
(45) Date of Patent: Feb. 21, 2017

(54) SYSTEM AND METHOD FOR PROVIDING ASSURED DATABASE UPDATES VIA A ONE-WAY DATA LINK

(71) Applicant: Owl Computing Technologies, Inc., Ridgefield, CT (US)

(72) Inventors: Ronald Mraz, South Salem, NY (US); Robert M Zucker, Brewster, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 315 days.

(21) Appl. No.: 14/567,355

(22) Filed: Dec. 11, 2014

(65) Prior Publication Data

US 2015/0370826 A1    Dec. 24, 2015

Related U.S. Application Data

(60) Provisional application No. 62/015,689, filed on Jun. 23, 2014.

(51) Int. Cl.
G06F 17/30    (2006.01)

(52) U.S. Cl.
CPC ... *G06F 17/30174* (2013.01); *G06F 17/30345* (2013.01); *G06F 17/30371* (2013.01)

(58) Field of Classification Search
USPC .................. 707/617, 611, 610; 709/219, 217
See application file for complete search history.

(56) References Cited

U.S. PATENT DOCUMENTS

| | | | |
|---|---|---|---|
| 4,672,601 A | 6/1987 | Ablay | |
| 5,282,200 A | 1/1994 | Dempsey et al. | |
| 5,703,562 A | 12/1997 | Nilsen | |

(Continued)

FOREIGN PATENT DOCUMENTS

| | | |
|---|---|---|
| EP | 2045750 A2 | 8/2009 |
| WO | 2004105297 A2 | 12/2004 |

(Continued)

OTHER PUBLICATIONS

M. Anderson, C. North, J. Griffin, R. Milner, J. Yesberg, K. Yiu, "Starlight: Interactive Link," 1996, Defence Science & Technology Organisation, Salisbury, South Australia, Australia.

(Continued)

*Primary Examiner* — Hung T Vy
(74) *Attorney, Agent, or Firm* — John S. Economou

(57) ABSTRACT

A system for assuredly copying information from a reference database to a remote database. A send server is coupled to a first network. A receive server is coupled to a second network. A one-way data link provides unidirectional transfer of information from the send server to the receive server. A monitor application iteratively forwards update files including sequence information to the send server. An update application receives each update file and updates the remote database based therein. The update files are also sequentially stored in the send server in groups and each group is sent to the receive server and stored in memory. If an update file is not received in proper sequential order, the receive server stops sending update files in the current group and instead reads the missing update file and subsequent update files in the current group from memory and forwards such files to the update application.

23 Claims, 2 Drawing Sheets

(56) References Cited

U.S. PATENT DOCUMENTS

| | | | | |
|---|---|---|---|---|
| 5,742,792 | A * | 4/1998 | Yanai | G06F 3/0601 710/1 |
| 5,769,527 | A | 6/1998 | Taylor et al. | |
| 5,889,935 | A * | 3/1999 | Ofek | G06F 11/2066 709/217 |
| 5,983,332 | A | 11/1999 | Watkins | |
| 6,052,797 | A * | 4/2000 | Ofek | G06F 11/2064 709/219 |
| 6,108,787 | A | 8/2000 | Anderson et al. | |
| 6,178,427 | B1 | 1/2001 | Parker | |
| 6,262,993 | B1 | 7/2001 | Kirmse | |
| 6,415,329 | B1 | 7/2002 | Gelman et al. | |
| 6,529,917 | B1 | 3/2003 | Zoltan | |
| 6,546,422 | B1 | 4/2003 | Isoyama et al. | |
| 6,578,022 | B1 | 6/2003 | Foulger et al. | |
| 6,609,183 | B2 | 8/2003 | Ohran | |
| 6,665,268 | B1 | 12/2003 | Sato et al. | |
| 6,728,213 | B1 | 4/2004 | Tzeng et al. | |
| 6,745,209 | B2 | 6/2004 | Holenstein et al. | |
| 6,792,432 | B1 | 9/2004 | Kodavalla et al. | |
| 6,807,166 | B1 | 10/2004 | Ohura | |
| 6,988,148 | B1 | 1/2006 | Sheth | |
| 7,016,085 | B2 | 3/2006 | Gonzalez et al. | |
| 7,095,739 | B2 | 8/2006 | Mamillapalli et al. | |
| 7,246,156 | B2 | 7/2007 | Ginter et al. | |
| 7,260,833 | B1 | 8/2007 | Schaeffer | |
| 7,339,929 | B2 | 3/2008 | Zelig et al. | |
| 7,356,581 | B2 | 4/2008 | Hashimoto | |
| 7,370,025 | B1 | 5/2008 | Pandit | |
| 7,389,323 | B2 | 6/2008 | Tanimoto | |
| 7,403,946 | B1 | 7/2008 | Taylor | |
| 7,440,424 | B2 | 10/2008 | Nam et al. | |
| 7,454,366 | B2 | 11/2008 | Kato | |
| 7,512,116 | B2 | 3/2009 | Ohura | |
| 7,529,943 | B1 | 5/2009 | Beser | |
| 7,720,903 | B1 | 5/2010 | Huckins | |
| 8,068,415 | B2 | 11/2011 | Mraz | |
| 8,352,450 | B1 | 1/2013 | Mraz et al. | |
| 8,555,273 | B1 * | 10/2013 | Chia | G06F 8/665 717/168 |
| 2001/0027453 | A1 | 10/2001 | Suto | |
| 2002/0003640 | A1 | 1/2002 | Trezza | |
| 2002/0029281 | A1 | 3/2002 | Zeidner et al. | |
| 2002/0118671 | A1 | 8/2002 | Staples et al. | |
| 2003/0058810 | A1 | 3/2003 | Petronic | |
| 2003/0119568 | A1 | 6/2003 | Menard | |
| 2003/0195932 | A1 | 10/2003 | Tanabe et al. | |
| 2003/0225798 | A1 | 12/2003 | Norcott | |
| 2004/0058710 | A1 | 3/2004 | Timmins et al. | |
| 2004/0103199 | A1 | 5/2004 | Chao et al. | |
| 2004/0236874 | A1 | 11/2004 | Largman et al. | |
| 2005/0033990 | A1 | 2/2005 | Harvey et al. | |
| 2005/0055382 | A1 | 3/2005 | Ferrat et al. | |
| 2005/0055385 | A1 | 3/2005 | Sinha et al. | |
| 2005/0193024 | A1 | 9/2005 | Beyer et al. | |
| 2005/0201373 | A1 | 9/2005 | Shimazu et al. | |
| 2005/0216520 | A1 | 9/2005 | He et al. | |
| 2005/0259587 | A1 | 11/2005 | Wakumoto et al. | |
| 2006/0114566 | A1 | 6/2006 | Ohmori et al. | |
| 2006/0153092 | A1 | 7/2006 | Matityahu et al. | |
| 2006/0153110 | A1 | 7/2006 | Morgan et al. | |
| 2006/0173850 | A1 | 8/2006 | Auer et al. | |
| 2006/0209719 | A1 | 9/2006 | Previdi et al. | |
| 2007/0019683 | A1 | 1/2007 | Kryzyanowski | |
| 2007/0223158 | A1 | 9/2007 | Ma et al. | |
| 2009/0024612 | A1 | 1/2009 | Tang et al. | |
| 2012/0124573 | A1 * | 5/2012 | Mamtani | A63F 13/12 718/1 |

FOREIGN PATENT DOCUMENTS

| | | |
|---|---|---|
| WO | 2010132647 A1 | 11/2010 |
| WO | 2012012266 A2 | 1/2012 |

OTHER PUBLICATIONS

"Interactive Link White Paper," Jul. 27, 2001, Tenix Defence Pty Ltd, Mawson Lakes, South Australia, Australia.

"Veto Uni-directional Network Bridge and Data Pump Applications White Paper", UNB and DPA White Paper by Tenix Datagate Pty Ltd, 2002, pp. 1-6.

Westmacott J., "Unidirectional Networking: GIAC Security Essential Certification Practical Assignment Version 1.46", SANS Institute, 2003.

Nilsen, Curt A., Information security implementations for Remote Monitoring; Symposium on Int'l Safeguards, Int'l Atomic Energy Agency, Vienna, Austria, Oct. 13-17, 1997.

Nilsen, Curt A. et al., The Secure Data Mirror; INMM; Nuclear Materials Managemenet; vol. XXVII (No. 2), 39th Annual Mtg. Proceedings, Naples, FL, Jul. 26-30, 1998, pp. 1322-1327.

Kang, M.H. et al: "Design and Assurance Strategy for the NRL Pump," Computer, IEEE Service Center, Los Alamitos, CA, US, vol. 31, No. 4, Apr. 1998, pp. 56-63.

Moore, Andrew P.: "Network Pump (NP) Security Target," Naval Research Laboratory Washington DC 20375-5320, [Online], May 29, 2000, pp. I-54, Retrieved from the Internet: URL:http://chacs.nrl.navy.mil/publications/CHACS/2000/2000moore-NPST.pdf&-gt; [retrieved on Jul. 30, 2012].

Kang M.H. et al: "A Network Pump," IEEE Transactions on Software Engineering, IEEE Service Center, Los Alamitos, CA, US, vol. 22, No. 5, May 1, 1996, pp. 329-338.

Kang M.H. et al: "An Architecture for multilevel secure interoperability," Computer Security Applications Conference, 1997. Proceedings., 13th Annual San Diego, CA, USA Dec. 8-12, 1997, Los Alamitos, CA USA, IEEE Comput. Soc, US, Dec. 8, 1997, pp. 194-204.

Davidson, J.A.: "Asymmetric Isolation," Computer Security Applications Conference, 1996., 12th Annual San Diego, CA, USA Dec. 9-13, 1996, Los Alamitos, CA, USA, IEEE Comput. Soc. US, Dec. 9, 1996, pp. 44-54.

Search and Examination Report for GB Application No. GB 1311652.0 dated Dec. 20, 2013.

* cited by examiner

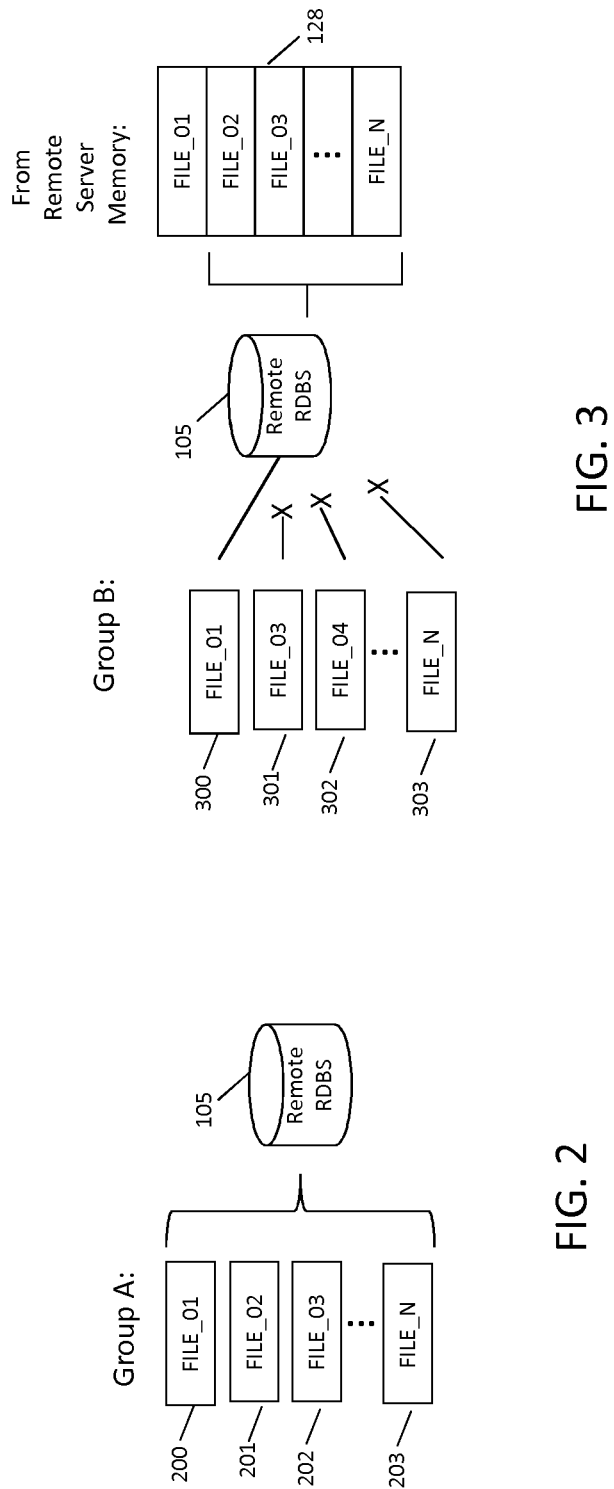

SYSTEM AND METHOD FOR PROVIDING ASSURED DATABASE UPDATES VIA A ONE-WAY DATA LINK

FIELD

This disclosure relates generally to a system and method for providing assured database updates via a one-way data link.

BACKGROUND

Protection of computer or data networks from undesired and unauthorized data disclosure, interception or alteration has been a perennial concern in the field of computer and network security, for which firewalls and anti-spyware software have been developed to address security threats to computers and networks connected to the Internet and to protect them from possible cyber-attacks, such as Trojan horse-type viruses or worms that may trigger undesired and unauthorized data disclosure by these computers and networks. However, for high security computer networks, such as those used by government agencies, intelligence communities, and certain commercial applications, conventional network security devices such as firewalls may not provide sufficiently reliable protection from undesired disclosure.

A high level of network security can be attained through the use of one-way data links, which isolate secure networks from security breaches (i.e., undesired and unauthorized data flow out of the secure network) while still allowing data from a low security environment to enter the network in a controlled manner or vice versa. Various systems and methods have been developed for implementing one-way data transfer to a secure network, including both hardware and software implementations of one-way data links.

Software solutions include standard Internet firewalls as well as operating systems configured with specialized rules for restricted unidirectional information flow. Systems such as these are designed to have great flexibility, but are now being asked to perform strict unidirectional data transfer. The complexity of software-implemented one-way data transfer is such that it is difficult to validate and verify that the controlled interface is strictly one-way, failsafe and resistant to reconfiguration through administrator error or malicious intent. Additionally, it is difficult to prove in complex systems that data is not bypassing the one way security feature.

As an alternative to software-based one-way data transfer, hardware-based unidirectional interfaces have also been developed. Since such systems implement the unidirectional policy of the controlled interface in hardware, the one-way nature and non-bypassable operation of the device can be validated to a high degree of assurance. Highly engineered solutions, such as the Owl Computing Technologies Dual-Diode, (described in U.S. Pat. No. 8,068,415, the disclosure of which is incorporated herein by reference) provide a direct point-to-point optical link between the enclaves. The DualDiode one-way data link includes an optical transmitter (on the send side) coupled to an optical receiver (on the receive side) via an optical fiber that crosses the boundary from the send side to the receive side. The unidirectionality of the data transfer is enforced in the circuitry of the network interface cards at both enclave endpoints and in the cable interconnects (because there are no optical receiving devices coupled to the optical fiber on the send side and no optical transmitting devices coupled to the optical fiber on the receive side). In this way, the hardware provides an added layer of assurance of unidirectional information flow and non-bypassable operation. In contrast to software based one-way data transfer systems, it is easy to prove that data is not bypassing the DualDiode. One problem that arises in such systems, however, is the detection of transmission errors for data passing from a transmitting server to a receiving server, since no feedback is provided (or could be provided) from the receiving server to the transmitting server in view of the one-way nature of the transmission along the one-way link coupling the transmitting server to the receiving server. This can be particularly troublesome when the data passing across the one-way link constitutes database update information for updating a remote database at a server coupled to the receiving server so that the remote database includes the same information as a reference database on the send side. This is because the transmitting server will not have any way to identify and correct transmission errors. As a result, any database update data lost during transmission cannot be recovered and the remote database will not be fully updated to match the reference database.

Accordingly, there is a need for a system and method which assures that a remote database receives every database update message transmitted across a one-way data link. Additionally, there is a need for a way to automatically recover when messages are missed due to networking or power issues.

SUMMARY

In one aspect, a system is provided for assuredly copying information from a reference database to a remote database. The reference database has an associated log file including sequential entries for each change made to the reference database. The system includes a send server coupled to a first network, a receive server coupled to a second network, and a one-way data link for unidirectional transfer of information from the send server to the receive server. A monitor application is also provided for reading the log file at predetermined intervals, for generating a set of database update information including each new entry in the log file, for providing the new set of database update information with sequence information, and for sequentially forwarding each set of database update information to the send server. Finally, an update application is provided for receiving each set of database update information and for updating the remote database based on entries included in each received set of database update information. The send server is configured to forward each received set of database update information to the receive server via the one-way data link and to store each set of database update information in a memory in the send server. The send server is also configured to, after receipt of all sets of database update information in a current group, to compress all of the stored sets of database update information into a single compressed file and to forward the single compressed file to the receive server. The receive server is configured to receive each set of database update information from the send server via the one-way data link, to extract sequence information from a current set of database update information and to compare the extracted sequence information with sequence information for an immediately previously received set of database update information to determine if the current set of database update information was received in proper sequential order. The receive server is also configured to forward the current set of database update information to the update application via the second network if the current set of database update information was determined to be received in proper sequential order. The receive server is also configured to receive the single compressed file from the send server via the one-way data link, to decompress the single compressed file and to store all of the decompressed sets of database update information from the single compressed file in a memory in the receive server. The receive server is also configured to, if the current set of database update information was determined not to be received in proper sequential order, to discard each subsequent set of database update information in the current group, to identify an initial set of database update information in the memory in the receive server that corresponds to a next sequential set of database update information to the previously received set of database update information, and to read and forward the identified initial set of database update information and each subsequent sequential set of database update information in the memory in the receive server to the update application.

In one embodiment, the monitor application and reference database are within a server coupled to the first network and the monitor application is configured to forward each set of database update information to the send server via the first network, and the update application and remote database are within a server coupled to the second network, with the receive server is configured to forward each set of database update information to the update application via the second network. In another embodiment, the monitor application and reference database are within the send server, and the update application and remote database are within a server coupled to the second network, with the receive server is configured to forward each set of database update information to the update application via the second network. In yet another embodiment, the monitor application and reference database are within a server coupled to the first network and the monitor application is configured to forward each set of database update information to the send server via the first network, and the update application and remote database are within the receive server. In a still further embodiment, the monitor application and reference database are within the send server, and the update application and remote database are within the receive server.

In one embodiment, each set of database update information is stored as a database update file. The sequence information may be stored as part of a filename for each database update file or may be stored within each database update file.

In another embodiment, the sets of database update information are included within packets of information. Such packets of information may include UDP/IP packets or TCP/IP sockets communicating with a delimiting protocol between information sequences.

In another aspect, a method is provided for assuredly copying information from a reference database to a remote database. The reference database has an associated log file including sequential entries for each change made to the reference database. The log file is read at predetermined intervals, a set of database update information is generated including each new entry in the log file, and the new set of database update information is provided with sequence information. In a send server, each set of database update information is forwarded to a receive server via a one-way data link and each set of database update information is stored in a memory in the send server. After receipt of all sets of database update information in a current group in the send server, all of the stored sets of database update information are compressed into a single compressed file and the single compressed file is forwarded to the receive server. In the receive server, each set of database update information is received from the send server via the one-way data link, sequence information is extracted from a current set of database update information and the extracted sequence information is compared with sequence information for an immediately previously received set of database update information to determine if the current set of database update information was received in proper sequential order. If the current set of database update information was determined to be received in proper sequential order, the remote database is updated based on entries included in the current set of database update information. At the receive server, the single compressed file from the send server is received via the one-way data link, the single compressed file is decompressed and all of the decompressed sets of database update information from the single compressed file is stored in a memory in the receive server. Finally, if the current set of database update information was determined not to be received in proper sequential order, each subsequent set of database update information in the current group is discarded, an initial set of database update information in the memory in the receive server that corresponds to a next sequential set of database update information to the previously received set of database update information is identified, and the remote database is updated based on entries included in the identified initial set of database update information and each subsequent sequential set of database update information in the memory in the receive server.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The following detailed description, given by way of example and not intended to limit the present invention solely thereto, will best be understood in conjunction with the accompanying drawings in which:

FIG. 2 is a diagram showing transfer of database update files during normal operation; and FIG. 3 is a diagram showing transfer of database update files after occurrence of a transmission error.

DETAILED DESCRIPTION

Figure 1:
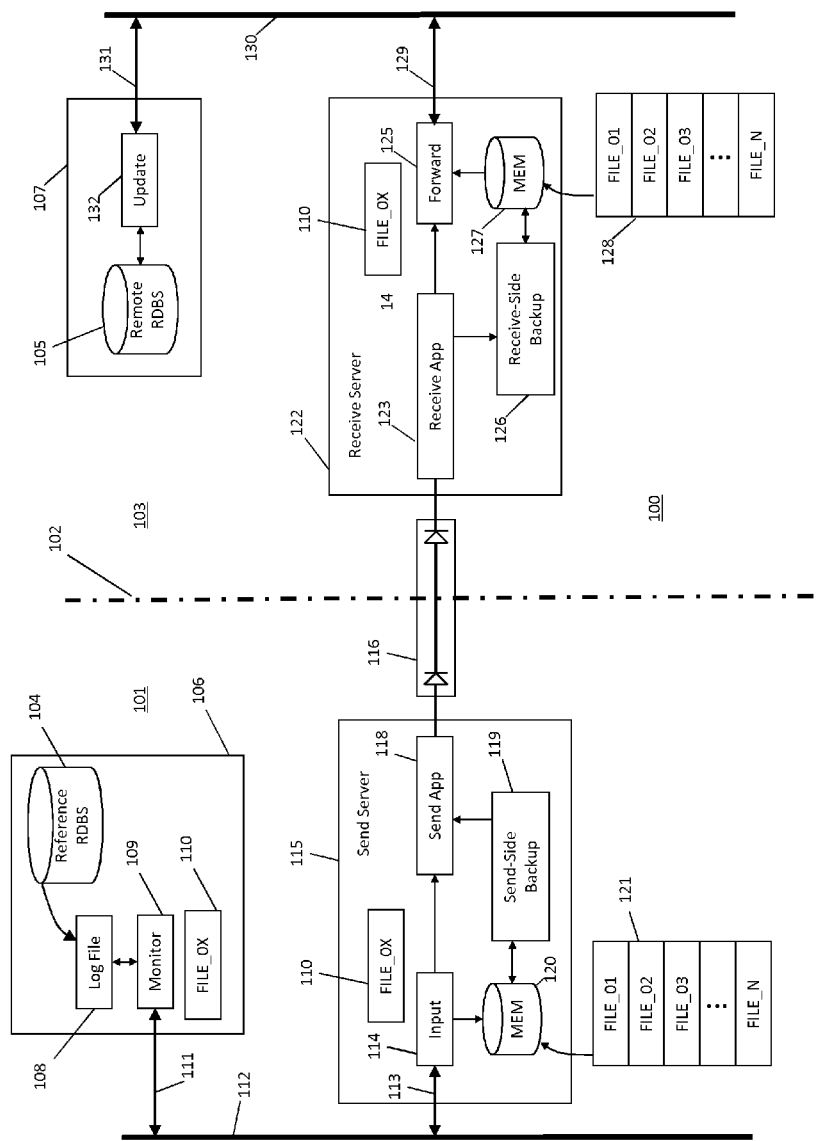
FIG. 1 is a block diagram of a one-way data transfer system for updating a remote database incorporating aspects of the invention.

In the present disclosure, like reference numbers refer to like elements throughout the drawings, which illustrate various exemplary embodiments of the present invention.

Referring now to the drawings, and in particular to FIG. 1, a database update system 100 is shown for securely transmitting update information from a reference database 104 on a first server 106 in a first network domain 101 (i.e., the area to the left of dotted line 102) to a remote database 105 on a second server 107 in a second network domain 103 (i.e., the area to the right of dotted line 102). In particular, the update information is transmitted to ensure that all of the information included in reference database 104 is also included in remote database 105. Each database 104, 105 is preferably a relational database management system (RDBS) such as Oracle, MySQL, Microsoft SQL Server, PostgreSQL, IBM DB2 etc. The reference database 104 is regularly updated in a conventional manner via clients (not shown) coupled to first network 112. All of the operations performed to change or add records to reference database 104 (e.g., insert, delete, update) are recorded as sequential entries in a log file 108.

The database update system 100 includes in a presently preferred embodiment a monitor application 109 running on first server 106, a send server 115, a one-way data link 116, a receive server 122 and an update application 132 running on second server 107. First server 106 and send server 115 are each coupled to first network 112 via respective conventional network interfaces 111, 113. Second server 107 and receive server 122 are each coupled to a second network 130 via respective conventional network interfaces 131, 129. In one alternative embodiment, the reference database 104 and monitor application 109 may be included within send server 115 (instead of on a separate server 106). In another alternative embodiment, the remote database 105 and the update application 132 may be included within receive server 122 (instead of on a separate server 107). As evident, in a still further embodiment, the reference database 104 and monitor application 109 may be included within send server 115 (instead of on a separate server 106) and the remote database 105 and the update application 132 may be included within receive server 122 (instead of on a separate server 107).

The first server 106, the send server 115 and the first network 112 are all within the first network domain 101. The second server 107, the receive server 122 and the second network 130 are each within the second network domain 103. Send server 115 can transfer information to receive server 122 via the one-way data link 116, but, because of the nature of the one-way data link (which is preferably an Owl DualDiode System), receive server 122 cannot transmit any information (or signals of any kind) to send server 115. Database update system 100 allows database update information to be transmitted from reference database 104 in first network domain 101 to remote database 105 in the second network domain 103 while maintaining the sanctity of first network domain 101 (because the one-way data link 116 prevents any information of any kind, even acknowledgement signals, from entering first network domain 101. This is particularly useful when the first network domain 101 requires high security as typically required for industrial process control networks for power plants or other sensitive manufacturing processes, but information stored within the reference database 104 is also needed outside the first (secure) network domain 101, e.g., in a corporate business network in the second network domain 103.

Monitor application 109 running on first server 106 repetitively reads log file 108 to keep track of changes thereto and, either at regular predetermined intervals or upon a predetermined number of changes added to log file 108, writes each of the new entries into a new file 110 designated "FILE_0X" in FIG. 1. The filename "FILE_0X" is chosen such that X is a number from 1 to N and represents a series of files from FILE_01 to FILE_N. Monitor application 109 starts by writing updates into a first file "FILE_01" and upon each subsequent iteration increments X by one, until reaching N (the predetermined maximum number), and then starts with X=1 again. Each set of N files constitutes a single group. Monitor application 109 forwards (in correct sequence) each of the FILE_0X files 110 to send server 115 via network 112 in a conventional manner using conventional network addressing (e.g., TCP/IP). In the alternative embodiment where the monitor application 109 is in send server 115, monitor application 109 forwards the files 110 directly to input application 114 without any transmission over first network 112. In a further alternative embodiment, the index information (sequence information) may be included within file 110 instead of within the filename thereof.

Input application 114 at send server 115 receives each of the FILE_0X files 110 and forwards such file to a first input of send application 118 for transmission across one-way data link 116. Input application 114 also stores each of the received FILE_0X files 110 in a memory 120 in send server 115, providing a send-side backup copy of each file 110 (shown as FILE_01 to FILE_N in block 121). A send-side backup application 119 in send server 115 monitors memory 120 and, when N files have been stored (constituting the complete current group), compresses all of the backup files (i.e., FILE_01 to FILE_N) together and then forwards the compressed file to a second input of send application 118 for transmission across one-way data link 116.

A receive application 123 in receive server 122 receives the data stream from one-way data link 116 and forwards each respective FILE_0X file 110 directly to a forward application 125 running on receive server 122. Receive application 123 also forwards the compressed file (constituting all of the most recent files FILE_01 to FILE_N in the current group) to a receive-side backup application 126, which decompresses the file and stores the decompressed files in a memory 127 (the decompressed files are shown as FILE_01 to FILE_N in block 128 in FIG. 1).

Forward application 125 on receive server 122 receives each FILE_0X file 110 and compares the index X (obtained either from the filename or from sequence information stored in the file) to the index of the immediately preceding FILE_0X file 110. As shown in FIG. 2, as long as each received file has an index with a single increment over the prior received file index (e.g., file 200 "FILE_01," file 201 "FILE_02" and file 202 "FILE_03" are received in proper order), forward application 125 transmits the currently received FILE_0X file 110 to an update application 132 on second server 107 via second network 130 in a conventional manner using conventional network addressing (e.g., TCP/IP). In the alternative embodiment where the update application 132 is included within receive server 122, forward application 125 sends each file 110 directly to update application 132, without any transmission across second network 130. Update application 132 reads each received FILE_0X file 110 and updates remote database 105 based on each update entry included in the received FILE_0X file 110.

However, in the event that a transmission error occurs and one or more of the FILE_0X files 110 is not received, forward application 125 identifies, based on the index number (sequence information), that a file was not received and stops sending the received FILE_0X files 110 to update application 123 until all of the files in the current group have been received. A new group may be identified when the index for the current file 110 is less than the index for the previously received file, for example. This is shown in FIG. 3 where file 301 "FILE_03" is received after file 300 "FILE_01". The two files (file 301 and file 302) and any subsequently received file until (and including) file 303 "FILE_N" are discarded. Forward application 125 instead reads the remaining files in the current group (i.e., the missed file and any subsequent file up to the file with index N) from memory 127 (in this case, the files FILE_02 to FILE_N in block 128 in FIG. 1) and sequentially forwards such files to update application 132. Update application 132, as described above, sequentially updates remote database 105 based on the entries in each received file. In this manner, system 100 is able to automatically correct transmission errors without any outside intervention and automatically maintains remote database 105 with the same information included in reference database 104—while also preventing any outside intrusions whatsoever into the first network domain 101. As one of ordinary skill in the art will readily recognize, the files 110 provided directly to forwarding application 125 by receive application 123 are preferably stored in a cache at least large enough to hold a group of at least N files, such that the files 110 for a group immediately subsequent to a group with a missing file are sequentially processed in the same manner as discussed above.

Although the present invention has been particularly shown and described with reference to the preferred embodiments and various aspects thereof, it will be appreciated by those of ordinary skill in the art that various changes and modifications may be made without departing from the spirit and scope of the invention. In particular, although the database update information discussed above is transmitted as a file, such information may also be included in packets of information such UDP/IP packets or TCP/IP sockets communicating with a delimiting protocol between information sequences. It is intended that the appended claims be interpreted as including the embodiments described herein, the alternatives mentioned above, and all equivalents thereto.

What is claimed is:

1. A system for assuredly copying information from a reference database to a remote database, the reference database having an associated log file including sequential entries for each change made to the reference database, comprising:
    a send server coupled to a first network;
    a receive server coupled to a second network;
    a one-way data link for unidirectional transfer of information from the send server to the receive server;
    a monitor application for reading the log file at predetermined intervals, for generating a set of database update information including each new entry in the log file, for providing the new set of database update information with sequence information, and for sequentially forwarding each set of database update information to the send server; and
    an update application for receiving each set of database update information and for updating the remote database based on entries included in each received set of database update information;
    wherein the send server is configured to forward each received set of database update information to the receive server via the one-way data link and to store each set of database update information in a memory in the send server;
    wherein the send server is also configured to, after receipt of all sets of database update information in a current group, to compress all of the stored sets of database update information into a single compressed file and to forward the single compressed file to the receive server;
    wherein the receive server is configured to receive each set of database update information from the send server via the one-way data link, to extract sequence information from a current set of database update information and to compare the extracted sequence information with sequence information for an immediately previously received set of database update information to determine if the current set of database update information was received in proper sequential order;
    wherein the receive server is also configured to forward the current set of database update information to the update application if the current set of database update information was determined to be received in proper sequential order;
    wherein the receive server is also configured to receive the single compressed file from the send server via the one-way data link, to decompress the single compressed file and to store all of the decompressed sets of database update information from the single compressed file in a memory in the receive server; and
    wherein the receive server is also configured to, if the current set of database update information was determined not to be received in proper sequential order, to discard each subsequent set of database update information in the current group, to identify an initial set of database update information in the memory in the receive server that corresponds to a next sequential set of database update information to the previously received set of database update information, and to read and forward the identified initial set of database update information and each subsequent sequential set of database update information in the memory in the receive server to the update application.

2. The system of claim 1, wherein the monitor application and reference database are within a server coupled to the first network and the monitor application is configured to forward each set of database update information to the send server via the first network.

3. The system of claim 1, wherein the update application and remote database are within a server coupled to the second network and the receive server is configured to forward each set of database update information to the update application via the second network.

4. The system of claim 1, wherein each set of database update information comprises a database update file.

5. The system of claim 4, wherein the sequence information is stored as part of a filename for each database update file.

6. The system of claim 4, wherein the sequence information is stored within each database update file.

7. The system of claim 1, wherein each set of database update information comprises a set of packets of information.

8. A system for assuredly copying information from a reference database to a remote database, the reference database having an associated log file including sequential entries for each change made to the reference database, comprising:
    a send server coupled to a first network;
    a receive server coupled to a second network;
    a one-way data link for unidirectional transfer of information from the send server to the receive server; and
    an update application for receiving each set of database update information and for updating the remote database based on entries included in each received set of database update information;
    wherein the reference database is within the send server,
    wherein the send server is configured to read the log file at predetermined intervals, to generate a set of database update information including each new entry in the log file, to provide the new set of database update information with sequence information, to forward each set of database update information to the receive server via the one-way data link and to store each set of database update information in a memory in the send server;
    wherein the send server is also configured to, after processing of all sets of database update information in a current group, to compress all of the stored sets of database update information into a single compressed file and to forward to the single compressed file to the receive server;

wherein the receive server is configured to receive each set of database update information from the send server via the one-way data link, to extract sequence information from a current set of database update information and to compare the extracted sequence information with sequence information for an immediately previously received set of database update information to determine if the current set of database update information was received in proper sequential order;

wherein the receive server is also configured to forward the current set of database update information to the update application if the current set of database update information was determined to be received in proper sequential order;

wherein the receive server is also configured to receive the single compressed file from the send server via the one-way data link, to decompress the single compressed file and to store all of the decompressed sets of database update information from the single compressed file in a memory in the receive server; and wherein the receive server is also configured to, if the current set of database update information was determined not to be received in proper sequential order, to discard each subsequent set of database update information in the current group, to identify an initial set of database update information in the memory in the receive server that corresponds to a next sequential set of database update information to the previously received set of database update information, and to read and forward the identified initial set of database update information and each subsequent sequential set of database update information in the memory in the receive server to the update application.

9. The system of claim 8, wherein each set of database update information comprises a database update file.

10. The system of claim 9, wherein the sequence information is stored as part of a filename for each database update file.

11. The system of claim 9, wherein the sequence information is stored within each database update file.

12. The system of claim 8, wherein each set of database update information comprises a set of packets of information.

13. A system for assuredly copying information from a reference database to a remote database, the reference database having an associated log file including sequential entries for each change made to the reference database, comprising:
  a send server coupled to a first network;
  a receive server coupled to a second network;
  a one-way data link for unidirectional transfer of information from the send server to the receive server; and
  a monitor application for reading the log file at predetermined intervals, for generating a set of database update information including each new entry in the log file, for providing the new set of database update information with sequence information, and for sequentially forwarding each set of database update information to the send server via the first network;
  wherein the send server is configured to forward each received set of database update information to the receive server via the one-way data link and to store each set of database update information in a memory in the send server;
  wherein the send server is also configured to, after receipt of all sets of database update information in a current group, to compress all of the stored sets of database update information into a single compressed file and to forward to the single compressed file to the receive server;
  wherein the remote database is within the receive server;
  wherein the receive server is configured to receive each set of database update information from the send server via the one-way data link, to extract sequence information from a current set of database update information and to compare the extracted sequence information with sequence information for an immediately previously received set of database update information to determine if the current set of database update information was received in proper sequential order;
  wherein the receive server is also configured to update the remote database file based on entries included in the current set of database update information if the current set of database update information was determined to be received in proper sequential order;
  wherein the receive server is also configured to receive the single compressed file from the send server via the one-way data link, to decompress the single compressed file and to store all of the decompressed sets of database update information from the single compressed file in a memory in the receive server; and
  wherein the receive server is also configured to, if the current set of database update information was determined not to be received in proper sequential order, to discard each subsequent set of database update information in the current group, to identify an initial set of database update information in the memory in the receive server that corresponds to a next sequential set of database update information to the previously received set of database update information, and to update the remote database based on entries included in the identified initial set of database update information and each subsequent sequential set of database update information in the memory in the receive server.

14. The system of claim 13, wherein each set of database update information comprises a database update file.

15. The system of claim 14, wherein the sequence information is stored as part of a filename for each database update file.

16. The system of claim 14, wherein the sequence information is stored within each database update file.

17. The system of claim 13, wherein each set of database update information comprises a set of packets of information.

18. A system for assuredly copying information from a reference database to a remote database, the reference database having an associated log file including sequential entries for each change made to the reference database, comprising:
  a send server coupled to a first network;
  a receive server coupled to a second network; and
  a one-way data link for unidirectional transfer of information from the send server to the receive server;
  wherein the reference database is within the send server,
  wherein the send server is configured to read the log file at predetermined intervals, to generate a set of database update information including each new entry in the log file, to provide the new set of database update information with sequence information, to forward each set of database update information to the receive server via the one-way data link and to store each set of database update information in a memory in the send server;

wherein the send server is also configured to, after processing of all sets of database update information in a current group, to compress all of the stored sets of database update information into a single compressed file and to forward to the single compressed file to the receive server;

wherein the remote database is within the receive server;

wherein the receive server is configured to receive each set of database update information from the send server via the one-way data link, to extract sequence information from a current set of database update information and to compare the extracted sequence information with sequence information for an immediately previously received set of database update information to determine if the current set of database update information was received in proper sequential order;

wherein the receive server is also configured to update the remote database file based on entries included in the current set of database update information if the current set of database update information was determined to be received in proper sequential order;

wherein the receive server is also configured to receive the single compressed file from the send server via the one-way data link, to decompress the single compressed file and to store all of the decompressed sets of database update information from the single compressed file in a memory in the receive server; and wherein the receive server is also configured to, if the current set of database update information was determined not to be received in proper sequential order, to discard each subsequent set of database update information in the current group, to identify an initial set of database update information in the memory in the receive server that corresponds to a next sequential set of database update information to the previously received set of database update information, and to update the remote database based on entries included in the identified initial set of database update information and each subsequent sequential set of database update information in the memory in the receive server.

19. The system of claim 18, wherein each set of database update information comprises a database update file.

20. The system of claim 19, wherein the sequence information is stored as part of a filename for each database update file.

21. The system of claim 19, wherein the sequence information is stored within each database update file.

22. The system of claim 18, wherein each set of database update information comprises a set of packets of information.

23. A method for assuredly copying information from a reference database to a remote database, the reference database having an associated log file including sequential entries for each change made to the reference database, comprising the steps of:

reading the log file at predetermined intervals, generating a set of database update information including each new entry in the log file, and providing the new set of database update information with sequence information;

forwarding, in a send server, each set of database update information to a receive server via a one-way data link and storing each set of database update information in a memory in the send server;

after receipt of all sets of database update information in a current group in the send server, compressing all of the stored sets of database update information into a single compressed file and forwarding the single compressed file to the receive server;

receiving, in the receive server, each set of database update information from the send server via the one-way data link, extracting sequence information from a current set of database update information and comparing the extracted sequence information with sequence information for an immediately previously received set of database update information to determine if the current set of database update information was received in proper sequential order;

if the current set of database update information was determined to be received in proper sequential order, updating the remote database based on entries included in the current set of database update information;

receiving, at the receive server, the single compressed file from the send server via the one-way data link, decompressing the single compressed file and storing all of the decompressed sets of database update information from the single compressed file in a memory in the receive server; and if the current set of database update information was determined not to be received in proper sequential order, discarding each subsequent set of database update information in the current group, identifying an initial set of database update information in the memory in the receive server that corresponds to a next sequential set of database update information to the previously received set of database update information, and updating the remote database based on entries included in the identified initial set of database update information and each subsequent sequential set of database update information in the memory in the receive server.

* * * * *